June 18, 1935.  J. P. RUTH  2,005,562
LOCOMOTIVE
Filed Jan. 15, 1934
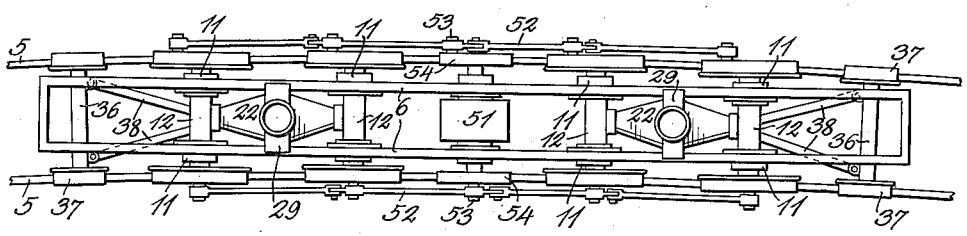
Fig. 1.
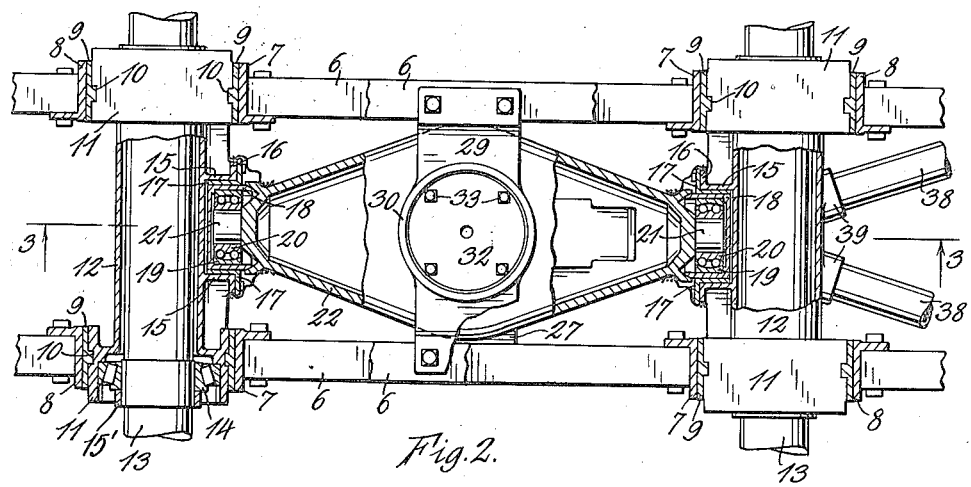
Fig. 2.
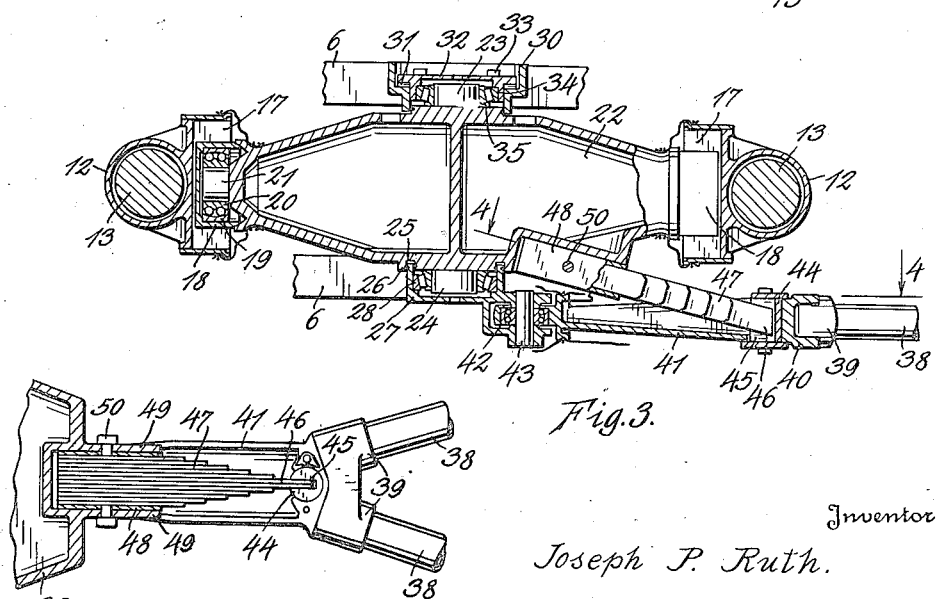
Fig. 3.
Fig. 4.
Inventor
Joseph P. Ruth.
By A. J. O'Brien
Attorney Patented June 18, 1935

2,005,562

UNITED STATES PATENT OFFICE 2,005,562

LOCOMOTIVE

Joseph P. Ruth, Denver, Colo., assignor to The Ruth Company, Denver, Colo., a corporation of Colorado Application January 15, 1934, Serial No. 706,683

6 Claims. (Cl. 105—176)

This invention relates to improvements in locomotives and has reference more particularly to an improved truck construction.

In the mountainous parts of our country, there are several railway lines of narrow gauge construction which have been used primarily for the transportation of ores and mining materials, and which, due to the contour of the country through which they pass, are exceptionally crooked.

It is the object of this invention to produce a locomotive truck construction in which means shall be provided for assisting in guiding the wheels of the locomotive while passing around turns so as to reduce to a minimum the friction between the flanges of the drive wheels and the rails, and in this way reduce wear and also reduce danger from having the locomotive jump the track as sometimes happens when no means is provided to prevent such an accident.

In passing around sharp curves, it is evident that where the frame of the locomotive is rigid, as it usually is, the wheels must have a transverse movement with respect to the same so as to enable them to follow the sides of the rail, and such transverse movement is usually present in locomotives of the ordinary construction.

Where no means is provided for automatically shifting the drive wheels transversely in accordance with the curvature of the track, a great pressure is produced by the flange coming against the inner surface of the rail on the outside of the curve, and as above intimated, this friction produces wear, is the cause at times of serious accidents and also consumes a large amount of power.

It is an object of this invention to produce a means comprising a pilot truck which shall be so connected with the axles of the two pair of drive wheels at each end of the locomotive that when the locomotive enters a curve, the pilot truck will move relative to the frame and set up a force which tends to shift the two drive axles and wheels transversely of the frame and in opposite directions so as to permit them to assume a position corresponding to the curvature of the track without at the same time producing the heavy frictional losses and strains that would otherwise be produced by the interaction of the drive wheel flanges and the rails.

This invention, briefly described, consists in providing a rigid locomotive frame near each end, with a pair of drive wheel and axle assemblies which are secured to the frame in such a way that the axle assemblies and wheels can move transversely, while being held in parallel relation. A lever is pivoted to the frame at a point half way between the axle assemblies and this lever has its ends connected with the axle assemblies in such a way that when one axle moves in one direction, the lever will impart a corresponding and equal movement of the other axle in the opposite direction. In addition to the interconnecting means a pilot truck is provided which is connected with the lever by means of a radius rod that has a pivotal connection with the lever. A spring secured to the lever has one end engaged by a part of the radius rod, and this spring will be put under tension whenever the radius rod moves transversely relative to the lever and in this way the pilot truck will transmit to the lever a force tending to shift the axle assemblies to any extent corresponding to the curvature of the track.

Having thus briefly described the invention, the same will now be described in detail, and for this purpose reference will be had to the accompanying drawing in which the preferred embodiment thereof has been illustrated, and in which:

Fig. 1 is a top plan view of the locomotive frame showing the drive wheel and pilot trucks connected therewith and resting on a curved section of railway;

Fig. 2 is a top plan view, partly in section and partly broken away, showing the axle assemblies secured to the frame and interconnected by means of a lever and showing also a portion of the radius rod;

Fig. 3 is a section taken on line 3—3, Fig. 2; and

Fig. 4 is a section taken on line 4—4, Fig. 3.

In the drawing reference numerals 5 indicate the rails of the railway and reference numerals 6 the side members of the locomotive frame. The actual construction of the frame is not material to this invention, but the frame is preferably formed by two or more channel beams like those indicated by reference numeral 6 and which are connected at their ends with castings 7 that have rectangular openings provided with parallel vertical sides 8. Located within the openings are bearing plates 9 that have inwardly extending ribs 10 which project into corresponding grooves in the boxings 11 at the ends of the axle housing 12. The usual springs are interposed between the upper wall of the castings 7 and the bearing housings 11, but the springs have not been shown. Since the bearing plates can slide transversely of the frame, in the casting 7, and the boxings 11 can slide vertically in the bearing plate 8, it is evident that the axle assemblies can move transversely of the frame and that the frame can also move vertically with respect to the axle assemblies. Axles 13 extend through the axle housings and are provided with bearings like those designated by reference numeral 14. These bearings are held in place by rings 15' that are pressed onto the surface of the axle as shown in Fig. 2. The axle housings are provided on one side with parallel projecting walls 15 having outwardly extending flanges 16. Secured to the flanges 16 are bearing plates 17, whose side walls are vertical. A boxing 18 has spaced parallel walls that engage the inner walls of the bearing plates so that it may slide vertically within these bearing plates and the inner surface of the part 18 is preferably cylindrical and serves as a seat for the ring 19 of the ball bearing, whose inner ring 20 surrounds the cylindrical end portion 21 of the lever 22. Lever 22 is preferably a casting which is hollow and is provided at its center portion with trunnions 23 and 24. The under surface, which surrounds the trunnion 24, has a circular groove 25 which is adapted to receive the circular flange 26 of the transversely extending support 27. A roller bearing assembly 28 is interposed between the inside of the cylindrical flange and the trunnion 24. Extending across the frame above the lever is a transverse frame member 29 that has a central circular opening 30. This opening is bounded by cylindrical surfaces of different diameters and has an annular shoulder 31 on which a circular plate 32 rests and to which it is secured by means of bolts 33. The plate 32 has a downwardly extending circular flange 34 and a roller bearing 35 is interposed between the trunnion 23 and the inner surface of the flange 34, as shown in Fig. 3, from which it will be seen that the lever can turn about the axis of the trunnions 23 and 24 and is connected to the axle housings in such a way that the latter can move vertically with respect to the ends of the lever, and that the axles may also move transversely of the frame. The two axle housings are interconnected by the lever so that any transverse movement of one will produce a corresponding transverse movement in the opposite direction of the other.

Located underneath the frame of the locomotive is a pilot truck having an axle housing 36 and flanged wheels 37. Extending rearwardly from the axle housing are two radius rods 38, whose rear ends are connected to the sockets 39 in a casting 40. The casting 40 has a rearwardly projecting portion 41 provided at its end with a circular opening for the reception of the ball bearing 42. This ball bearing surrounds the pin 43 that is attached to the member 27. The ball bearing is of the type that permits a slight degree of universal movement so as to permit the twisting of the radius rod that occurs during operation to take place without producing severe strains. The part designated by reference numeral 41 is provided with a recess or depression in its upper surface and at the front end of this depression is a circular opening in which is located a cylindrical plug 44. This plug has a slot 45 that extends inwardly from one side and which serves the two master leaves 46 of the spring assembly. This spring assembly consists of a number of spring leaves which have been indicated as an entirety by reference numeral 47 and one end of these springs or leaves is enclosed in a metal sleeve 48, which is shrunk in place on the springs so as to hold them rigidly assembled. The sleeve 48 is inserted into a recess 49 in the lower surface of the lever 22 and the spring assembly is held against removal by means of a bolt 50.

It is now apparent from an inspection of the drawing that if the pilot wheels are in alignment with the drive wheels, the center of the lever 22 will coincide with the center line of the radius rod and that the latter will occupy a position with respect to the lever 22 like that shown in Fig. 4, in which position the spring assembly is not under any tension in either direction. As soon as the locomotive enters onto a curved portion of track, the leading pilot truck will move transversely about the pivot pin 43 and this will flex the master leaves 46 and the shorter leaves of the spring assembly on the side towards which the movement occurs. This flexing of the spring assembly produces a force that tends to rotate lever 22 in the same direction, and this force is transmitted to the axle assemblies by the lever and assists in moving the axle assemblies and wheels transversely of the frame and in opposite directions. By shifting the wheels in the manner pointed out and shown in Fig. 1, the flanges of the wheels will be moved into position to correspond to the curvature of the track without the production of the objectionable strains to which attention has heretofore been called.

It will be seen from the drawing that the locomotive is provided with four pair of drive wheels and two pilot trucks and that these are systematically arranged with respect to the center of the frame. The locomotive is intended to be operated by internal combustion engines and has a set of transmission gears located in the housing 51 and the power is transmitted to the wheels by means of connecting rods 52 that are driven from the crank pins 53 on the crank disks 54. The pilot truck at the rear of the locomotive assists in shifting the rear drive wheels and since this locomotive is intended to travel in either direction, the rear pilot truck becomes the leading pilot truck when the direction of motion is reversed.

It will be seen from the above description and from the drawing that the construction employed in this locomotive has two or more pair of drive axles which are interconnected by means of a lever so that when one axle moves transversely in one direction, a corresponding transverse movement is imparted to the other axle in the opposite direction and that pilot trucks are provided and connected with the lever by means of a spring assembly so as to set up a yielding force tending to shift the axles transversely as soon as the locomotive enters on a curved section of track, thereby facilitating the alignment of the wheels to correspond to the curvature of the track.

Having described the invention what is claimed as new is:

1. A railway locomotive comprising, in combination, a rigid frame, two axle assemblies secured to the frame and extending transversely thereof, each assembly comprising an elongated housing, an axle extending through the housing and mounted for rotation therein, means for holding the axle from moving longitudinally relative to the housing, a wheel secured to each end of the shaft, means for holding the axle assemblies in parallel relation while permitting them to move transversely of the frame, a lever having its ends pivotally attached to the axle housings, a pivot rigidly connected with the frame and operatively connected with the lever at its center point whereby the axles and axle housings will be constrained to move simultaneously and equal distances in opposite directions, a pilot truck, and means, controlled by the position of the pilot truck for applying a yielding force to the lever to turn it about its center pivot.

2. A railway locomotive comprising, in combination, a rigid frame, two axle assemblies secured to the frame and extending transversely thereof, each assembly comprising an elongated housing, an axle extending through the housing and mounted for rotation therein, means for holding the axle from moving longitudinally relative to the housing, and a wheel secured to each end of the axle, means for holding the axle assemblies in parallel relation while permitting them to move transversely of the frame, a lever having its ends pivotally attached to the axle housings, a pivot rigidly connected with the frame and operatively connected with the lever at its center point whereby the axles and axle housings will be constrained to move simultaneously and equal distances in opposite directions, a pilot truck, a radius rod secured at one end to the pilot truck and having its other end pivotally connected with the lever, and means comprising springs for normally holding the pilot truck in a predetermined position relative to the lever.

3. A railway locomotive, comprising, in combination, a rigid frame, two axles secured to the frame and mounted for transverse movement thereof, means pivotally connected to the frame and with the axles for producing equal and simultaneous movement of the axles transversely of the frame, a pilot truck located in front of the two interconnected axles, and resilient means interposed between the pilot truck and the interconnected axles for producing a force tending to move the axle adjacent the pilot truck in the same direction with respect to the frame.

4. A railway locomotive, comprising, in combination, a rigid frame, two axle assemblies secured to the frame and mounted for transverse movement thereof, each assembly comprising, an axle housing, an axle extending through the housing, antifriction bearings between the axle and the housing, and a wheel at each end of the axle, a lever pivotally attached at its center to the frame and having its ends pivotally connected with the axle housings whereby when one housing is moved transversely of the frame, a corresponding movement in the other direction will be imparted to the other housing, a pilot truck located in front of the foremost axle housing and mounted for movement transversely of the frame, a radius rod having its front end attached to the pilot truck and its rear end pivotally connected with the lever, and resilient means for normally holding the radius rod in a predetermined position relative to the lever.

5. A railway locomotive comprising, in combination, a rigid frame, two axle assemblies secured to the frame and mounted for transverse movement thereof, means for holding the assemblies in parallel relation, each assembly comprising an axle housing, an axle and two wheels, a lever having its ends pivotally connected with the axle housings, a pivot secured to the frame and connected with the lever approximately at its middle point, whereby when one axle assembly is moved transversely of the frame the other axle assembly will move a corresponding distance in the opposite direction, a pilot truck, and a radius rod for connecting the truck with the lever and a resilient yielding connection between the radius rod and the lever, whereby a movement of the pilot truck transversely of the frame will produce a yielding force tending to impart a corresponding movement of the lever.

6. A railway locomotive comprising, in combination, a rigid frame, two axle assemblies secured to the frame and mounted for transverse movement thereof, means for holding the assemblies in parallel relation, each assembly comprising an axle housing, an axle and two wheels, a lever having its ends pivotally connected with the axle housings, a pivot secured to the frame and connected with the lever approximately at its middle point, whereby when one axle assembly is moved transversely of the frame the other axle assembly will move a corresponding distance in the opposite direction, a pilot truck, a radius rod having one end connected with the truck and the other pivotally connected with the lever, and springs interposed between the radius rod and the lever for allowing a relative movement of the radius rod and the lever.

JOSEPH P. RUTH.